United States Patent
Ng et al.

(10) Patent No.: US 11,359,963 B2
(45) Date of Patent: Jun. 14, 2022

(54) VARIABLE LASER ENERGY MULTI-SPECTROMETER FOR GAS AND PARTICULATE CHEMICALS IN AIR

(71) Applicant: The United States of America, as represented by the Secretary of the Navy, Crane, IN (US)

(72) Inventors: Kin Chiu Ng, Fresno, CA (US); Subrata Sanyal, Eastvale, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 50 days.

(21) Appl. No.: 16/929,646

(22) Filed: Jul. 15, 2020

(65) Prior Publication Data

US 2021/0018366 A1 Jan. 21, 2021

Related U.S. Application Data

(60) Provisional application No. 62/874,205, filed on Jul. 15, 2019.

(51) Int. Cl.
| | |
|---|---|
| *G01J 3/28* | (2006.01) |
| *G01J 3/02* | (2006.01) |
| *G01J 3/42* | (2006.01) |
| *G01J 3/04* | (2006.01) |

(52) U.S. Cl.
CPC ............ *G01J 3/0251* (2013.01); *G01J 3/0208* (2013.01); *G01J 3/42* (2013.01); *G01J 2003/042* (2013.01); *G01J 2003/423* (2013.01)

(58) Field of Classification Search
CPC .......... G01J 3/0251; G01J 3/0208; G01J 3/42; G01J 2003/042; G01J 2003/423; G01J 3/0213; G01J 3/10; G01J 3/2803; G01J 3/44; G01J 3/4406; G01J 3/0254; G01J 3/28; G01J 3/14; G01N 21/39; G01N 21/6402; G01N 21/65; G01N 21/718; G01N 2021/1738
See application file for complete search history.

(56) References Cited

U.S. PATENT DOCUMENTS

| | | | | |
|---|---|---|---|---|
| 3,497,690 | A * | 2/1970 | Bahr | .................. G01N 15/1475 250/461.2 |
| 2014/0300897 | A1* | 10/2014 | Treado | .................. G01J 3/0224 356/364 |
| 2019/0301931 | A1 | 10/2019 | Ng et al. | |

* cited by examiner

*Primary Examiner* — Abdullahi Nur
(74) *Attorney, Agent, or Firm* — Naval Surface Warfare Center, Crane Division; Eric Vanwiltenburg

(57) ABSTRACT

The present invention relates to the design, construction, and operation of a laser air-sampling multi-spectrometer; its operation with variable laser energy to simultaneously and/or sequentially perform spectrometric techniques of LAS, LEFS, RSS, and LIBS. The combined spectrometric operation will detect gas and particulate chemicals directly in a flowing stream of air sample and/or particulate chemicals on filter collected from the flowing stream of air sample.

9 Claims, 2 Drawing Sheets

VARIABLE LASER ENERGY MULTI-SPECTROMETER FOR GAS AND PARTICULATE CHEMICALS IN AIR

CROSS REFERENCE

This application claims priority to U.S. Provisional Application Ser. No. 62/874,205 filed on Jul. 15, 2019 the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,625) is assigned to the United States Government and is available for licensing for commercial purposes. Licensing and technical inquiries may be directed to the Technology Transfer Office, Naval Surface Warfare Center Corona Division, email: CRNA_CTO@navy.mil.

FIELD OF THE INVENTION

The present invention relates to spectroscopy for detecting chemicals.

BACKGROUND AND SUMMARY OF THE INVENTION

The present invention relates to a multi-spectrometer for detecting gaseous and particulate chemicals in air. Optical spectrometry is the primary technique for chemical identification and quantification. A major component in optical spectrometer is the radiation source. Laser light is directional, very intense, spectrally pure and narrow, and, therefore, is a common radiation source used in such techniques as laser absorption spectrometry (LAS), laser excited fluorescence spectrometry (LEFS), Raman scattering spectrometry (RSS), and laser induced breakdown spectrometry (LIBS). Each laser spectrometric technique provides a set of capabilities with advantages and limitations. A great number of spectrometers are commercially available, based on single-technique operation. Thus, a spectrometer based on laser absorption is UV-Vis (Ultra Violet—Visible) Absorption Spectrometer; on laser excited fluorescence is Fluorescence Spectrometer, Raman Spectrometer, or Laser Breakdown Emission Spectrometer.

The relative laser intensity (energy/power) for operation with the various spectrometric techniques, ranging order from lowest to highest, in general, is: laser absorption spectrometry, laser excited fluorescence spectrometry, Raman scattering spectrometry, and laser induced breakdown spectrometry. By using a certain level of laser energy, a particular spectrometric technique is operated optimally; this optimization depends also on the type of samples and chemicals. It is beneficial to vary the laser energy on the detection for unknown samples and chemicals. This invention allows such operation, leading to optimal results generated from one or more spectrometric techniques, within a short time.

According to an illustrative embodiment of the present disclosure, the design, construction, and operation of a laser air-sampling multi-spectrometer uses variable laser energy to use spectrometric techniques of LAS, LEFS, RSS, and LIBS either simultaneously and/or sequentially. The combined spectrometric operation will detect gas and particulate chemicals directly in a flowing stream of air sample and/or particulate chemicals on filter collected from the flowing stream of air sample. The results obtained and the information provided from the multiple spectrometric detection will be complementary and will greatly increase the accuracy and reliability for the sensing. The laser radiation is fully contained within the spectrometer and not exposed in the atmosphere, preventing potential hazards. Embodiments use deep UV lasers with wavelengths of shorter than 260 nm for enclosed beam application with the Variable Laser Energy Multi-Spectrometer, detecting biomolecules, explosives, aromatic organics, etc.

According to a further illustrative embodiment of the present disclosure, operation of the Variable Laser Energy Multi-Spectrometer for Gas and Particulate Chemicals in Air will generate a large set of data, and therefore, the statistical method of Chemo-metrics will be applied, providing a very high level of confidence in identification for substances of interest and a unique data-profile (fingerprint) for the sample.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
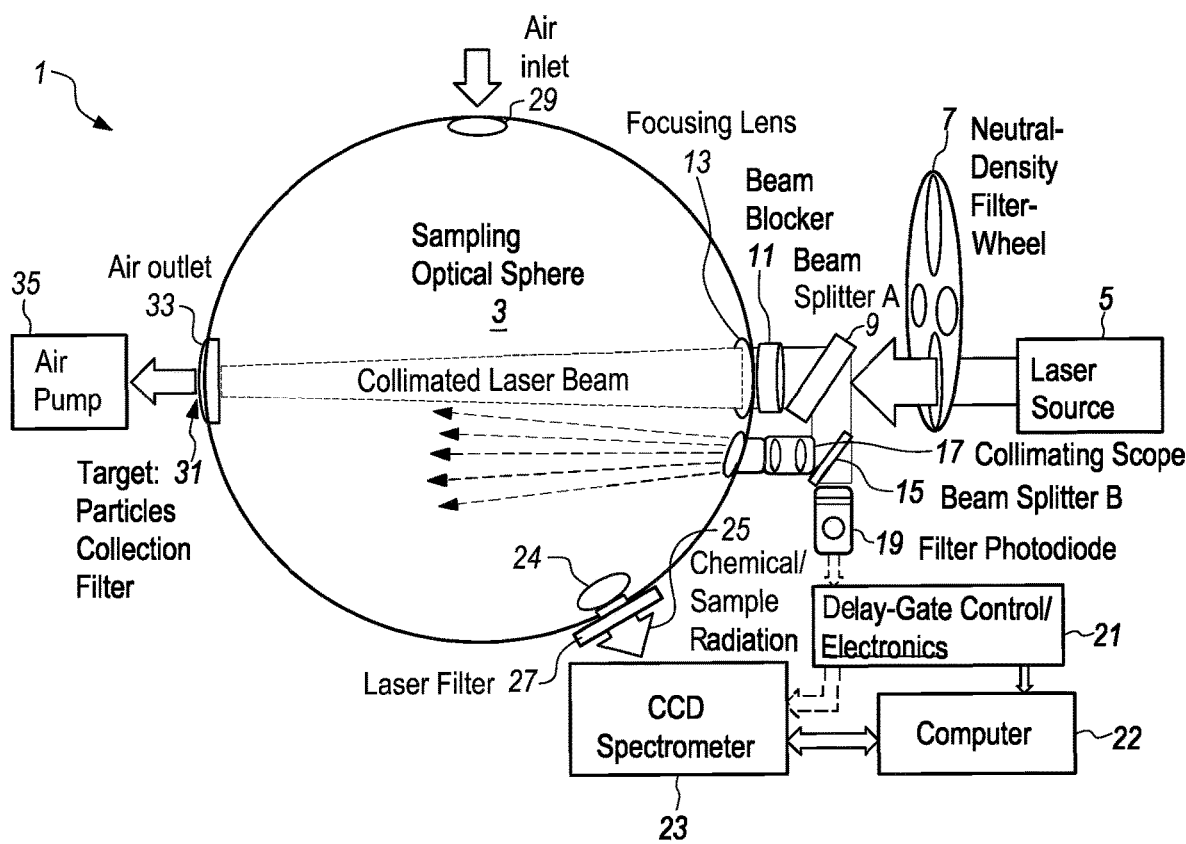
FIG. 1 shows an exemplary spectrometer.

FIG. 1 shows an exemplary spectrometer 1. The sampling optical sphere 3 can be 6" diameter, coated with an optical material that reflects all relevant light-wavelengths (from the sample, the substances of interest, the laser beam etc.) and provides multiple ports/openings. Laser source 5 generates lasers used in the testing. Exemplary laser sources include gas laser, solid-state laser, diode laser, or diode-array laser sources. Laser source 5 can generate pulsed lasers (e.g., duration-time of nanosecond, micro-second) with a pulsation rate from single shot to thousand hertz, and energy of micro-joules to tens of joules. A filter wheel 7 has a plurality of neutral density filters that can selectively attenuate the intensity (energy) of the laser radiation to pass through by using different neutral density filters. A first beam splitter 9 can use a 90:10 split of the incident laser beam with 90% of the radiation going towards the optical sphere 3 and 10% of the radiation going towards a second beam splitter 15. The beam blocker 11 can block the laser beam from entering the optical sphere 3 or reduce the energy of the beam. The focusing lens 13 is made of an optical material that allows the laser radiation to transmit; it collimates and diffusively focuses the laser beam onto the target filter.

The second beam splitter 15 can use a 80:20 split of the incident laser beam with 80% of the radiation going towards the collimating scope 17 and 20% of the radiation going towards the filter photodiode 19. The collimating scope/fiber optic 17 is of an optical material that allows the laser radiation to transmit; it collimates the laser beam onto the reflective wall of the optical sphere. The filter photodiode 19 has a band-pass filter allowing the source laser-radiation to pass through; the photodiode senses the pulsed radiation and sends out pulsating intensity signals. The delay-gate control/electronics 21 detect the pulsating "trigger" signal, sets a time-delay & gate width, and sends a delay-gate signal to a spectrometer; it also sends the intensity-signal of the radiation to the computer. The Charge Coupled Device (CCD) spectrometer 23 electronically receives a delay-gate signal and correspondingly detects the radiation input from the optical sphere 3; it also sends a detection output to a computer 23. The dispersive grating spectrometer spectrally separates and isolates the laser line and identifies radiation from substances of interest. The computer 22 is the master controller, analyzes all input signals, generates and displays the spectral information and results. The laser filter 27 is illustratively a cut-on long-pass spectral filter that can engaged to reduce or prevent the laser beam from entering the CCD spectrometer. It is not engaged for absorption/reflectance spectrometry operations. The particle collection filter-membrane 31 is made of a material non-absorbing of the laser beam that can withstand high temperatures (e.g., ceramic materials such as alumina) and has fine porosity (illustratively five micrometer diameter pores). Filter-membrane 31 collects particles in the air to create a target for laser emission testing. The filter membrane can be replaced after spectrometric operation. The air pump 35 is a vacuum pump that connects to the filter-membrane 31 through air outlet 33 and draws ambient air into the optical sphere 3 through air inlet 29 and out through the filter-membrane 31 and air outlet 33.

Figure 2:
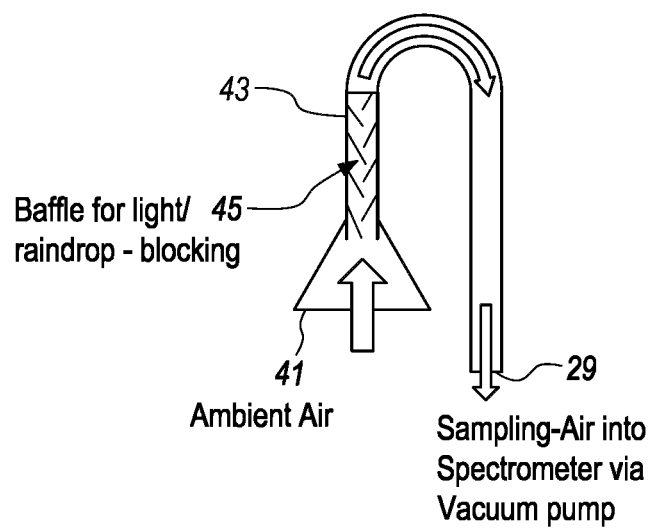
FIG. 2 shows an exemplary air intake section.

FIG. 2 shows an exemplary air intake section. Biomolecules can enter the spectrometer through an intake opening 41 (e.g., an inverted funnel) and stem 43 e.g., a tube 3" long and 0.25" inner diameter). Baffles 45 in spiral stages prevent scattered light or droplets of water from entering the biosensor. Intake opening 41 and stem 43 can have a grooved surface for facilitating drainage of liquids captured by baffles 45. The distance between intake opening 41 and the air inlet 29 can be short or long (for remote sampling).

Optical spectrometry is the primary technique for chemical identification and quantification. A major component in optical spectrometer is the radiation source. Laser light is directional, very intense, spectrally pure and narrow, and, therefore, is a common radiation source in such techniques as laser absorption spectrometry (LAS), laser excited fluorescence spectrometry (LEFS), Raman scattering spectrometry (RSS), and laser induced breakdown spectrometry (LIBS). Each laser spectrometric technique provides a set of capabilities with advantageous features and limitations. A large number of spectrometers are commercially available based on single-technique operation. Thus, a spectrometer based on laser absorption is UV-Vis Absorption Spectrometer; on laser excited fluorescence is Fluorescence Spectrometer, Raman Spectrometer, or Laser Breakdown Emission Spectrometer. Exemplary embodiments include the design, construction, and operation for a laser air-sampling multi-spectrometer that will operate the spectrometric techniques of LAS, LEFS, RSS, and LIBS, either simultaneously or sequentially.

The relative laser intensity (energy/power) for operation with the various spectrometric techniques, ranging order from lowest to highest, in general, is: laser absorption spectrometry (LAS), laser excited fluorescence spectrometry (LEFS), Raman scattering spectrometry (RSS), and laser induced breakdown spectrometry (LIBS). By using a certain level of laser energy, a particular spectrometric technique is operated optimally; this optimization depends also on the type of samples and chemicals. It therefore, is beneficial to vary the laser energy on the detection for unknown samples and chemicals. Exemplary embodiments allow utilization of varying laser energies, leading to meaningful results generated from one or more spectrometric techniques, within a short time.

Absorption Spectrometry monitors chemical-molecules in the ground electronic energy state. The ground state molecules can absorb a laser radiation having the energy resonant with that of the molecule. The magnitude of the laser absorption is registered as spectral signal for the LAS.

Fluorescence Spectrometry monitors chemical-molecules in the excited electronic energy state. A laser radiation having the resonant energy of the ground state molecules will energetically "push" the ground state molecules to an (excited) upper energy level. The unique spectral location and the magnitude of light emitted from the excited molecule is registered as spectral signal for the LEFS.

Laser Raman Scattering monitors chemical-molecules in a virtual upper vibrational energy level. The intense laser strikes on the molecule causing the whole molecule to shake/vibrate, with functional molecular groups vibrating at the virtual level and scattering/shifting the incident laser-light during this process. The characteristic spectral location and the magnitude of the scattered light is registered as spectral signal for RSS.

Laser Induced Breakdown Spectrometry monitors chemical-molecules or atoms in the excited electronic energy state. The high intensity laser ionizes a gas medium, generating a high temperature plasma (electrical discharge). The energetic plasma will break molecular bonds, generating molecular groups and atoms in the excited electronic state. The characteristic spectral location and intensity of molecular and atomic emission is registered as spectral signal for LIBS.

The principle of operation of an exemplary embodiment is based on the selection of laser energy used by setting a neutral density filter on the wheel, followed by detecting the laser absorption, laser excited fluorescence, laser induced Raman scattering, and laser induced breakdown emission sequentially or simultaneously. The initial step is drawing air into the sampling optical sphere, followed by setting a neutral density filter to allow the laser energy to pass through, and detecting the laser reflectance and/or radiation emission from the substances of interest in the enclosed air and/or particles on the collection filter. Another neutral density filter is set and the multi-spectrometric operation is repeated. The delay-gate control and electronics is interfaced and synchronized between the pulsed laser radiation and the CCD spectrometer detection so that the CCD spectrometer measures laser related net-signals (after correction from the background without the laser pulse). This background correction facilitates the spectrometer operate in field, ambient-condition. The large amount of spectral information collected from plurality laser energy and spectrometric operation will be analyzed with Chemo-metrics, obtaining high confidence identification for substances of interest and profiling for the air sample.

Laser Absorption (Reflectance) Spectrometry (LAS) Operation A gives optimal signal-to-noise for low energy requirement LAS. Laser absorption is measured with the corresponding reflectance detected. The laser beam is directed to the reflective wall of the optical sphere, leading to optimal homogeneous illumination of the entire sphere; LAS is performed primarily on the air within the sphere and partially on the particle collection filter. Therefore both gas and (air-floating and filter collected) particulate chemicals are detected. In this operation, the beam blocker is engaged so the majority of the laser energy is not used. The laser filter is not engaged so the laser reflectance from the sphere can be detected by the CCD spectrometer. The second beam splitter can be an 80:20 split of the incident laser beam (reflected from the first beam splitter), with 80% of the radiation goes towards the collimating scope and into the sphere, and 20% of the radiation (as reference) goes towards the filter photodiode. The delay-gate electronics receives the laser pulsation signal from the filter photodiode and sends the (reference) signal intensity to the computer. The laser reflectance from the sphere is detected with the CCD Spectrometer and the reflectance signal is sent to the computer. The computer analyzes the two input signals (reference and reflectance), performs an intensity-ratio-relationship computation, and determines accurately the magnitude of the laser absorption by the substance of interest since the fluctuation of the laser beam is accounted for from the reference signal.

In LAS Operation B, laser absorption is measured with the corresponding reflectance detected. Both the entire sphere and the particle collection filter are illuminated with the laser. In this operation, the beam blocker is not engaged and the first beam splitter directs majority of the laser radiation (energy) into the sampling optical sphere aiming at the particle collection filter. The second beam splitter can be an 80:20 split of the incident laser beam (reflected from the first beam splitter), with 80% of the radiation goes towards the collimating scope and into the sphere, and 20% of the radiation (as reference) goes towards the filter photodiode. The delay-gate electronics receives the laser signal from the filter photodiode and sends the (reference) signal intensity to the computer. The laser reflectance from the air within the sphere and the particle collection filter is detected with the CCD Spectrometer and the reflectance signal is sent to the computer. The computer analyzes the two input signals (reference and reflectance), performs an intensity-ratio-relationship computation, and determines accurately the magnitude of the laser absorption by the substance of interest since the fluctuation of the laser beam is accounted for from the reference signal. Both Operations A and B will detect gas, air-floating particulate, and filter-particle chemicals. Operation A is optimal for gas and floating particulate chemicals; operation B is optimal for particles collected on filter. Operation B simultaneously works with operation A.

Laser Excited Fluorescence Spectrometry (LEFS) is measured in the air within the sphere and on the particle collection filter. The beam blocker is disengaged and the first beam splitter directs majority of the laser radiation (energy) into the sampling optical sphere. The laser scattering and fluorescence emission is reflected and collected by the optical sphere. The engaged laser filter reduces or prevents the laser scattering but allows red-shifted fluorescence to arrive at the CCD Spectrometer. The fluorescence emission signal is sent to the computer.

Laser induced Raman Spectrometry (RSS) is measured primarily on the particle collection filter. The beam blocker is disengaged and the first beam splitter directs majority of the laser radiation (energy) into the sampling optical sphere. The laser scattering and Raman Scattering is reflected and collected by the optical sphere. The engaged laser filter sharply prevents the laser scattering but allows red-shifted Raman Scattering to arrive at the CCD Spectrometer. The Raman Scattering signal is sent to the computer.

Laser Induced Breakdown Spectrometry (LIBS) is measured on the particle collection filter. The beam blocker is disengaged and the first beam splitter directs majority of the laser radiation (energy) into the sampling optical sphere. The diffusely focused laser beam breaks down and ionizes the air above the surface of the collection filter, generating a high temperature (electrical discharge) plasma. The chemicals in the particles and air, within the plasma, get excited and emit their characteristic molecular/atomic radiation. The laser scattering and chemical emission is reflected and collected by the optical sphere. The engaged Laser Filter reduces or prevents the laser scattering but allows chemical emission to arrive at the CCD Spectrometer. The chemical molecular/atomic signal is sent to the computer.

All the emission techniques can be operated simultaneously; the efficiency for a spectrometry depends on laser energy, sample, and substance of interest. Therefore, employing a variable energy laser will optimize multiple spectrometric measurements on unknown samples and/or substances of interest.

The neutral density filter wheel is motorized; illustratively with four filters allowing pass 100% (non-stained plate), 10%, 1%, and, 0.1% of the laser energy. The user may set a filter or rotate the filters for (one at a time) operation via a computer. The user may perform single spectrometry of LAS operation A, or single spectrometry of LAS operation B, or simultaneous spectrometry of LEFS, RSS, and LIBS. The user may perform selective or sequential multi-spectrometry; for example:

single spectrometry of LAS operation A followed by single spectrometry of LAS operation B;
single spectrometry of LAS operation A followed by simultaneous spectrometry of LEFS, RSS, and LIBS;
single spectrometry of LAS operation B followed by simultaneous spectrometry of LEFS, RSS, and LIBS;
simultaneous spectrometry of LEFS, RSS, and LIBS followed by single spectrometry of LAS operation B;
simultaneous spectrometry of LEFS, RSS, and LIBS followed by single spectrometry of LAS operation A.

During an exemplary spectrometric operation, the particle collection filter is engaged, the vacuum pump is on, and the sampling air is continuously flowing into the optical sphere and out of the collection filter. The user can set a 40 second acquisition time to operate each of the spectrometry technique (LAS operation A, simultaneous LEFS, RSS, LIBS, or LAS operation B), corresponding to 10 seconds acquisition time for each laser energy (from using illustratively, four neutral density filters). The user can set the initiation time for the spectrometric operation, for example, one minute after the air pump is turned on. The particle filter is optionally replaced at the end of the operation.

A large amount of spectral information is collected and analyzed with the statistical method of Chemo-metrics. The emission spectra will consist of fluorescence, Raman scattering, and chemical molecular/atomic emission. The spectral peaks may consist both identifiable and non-identifiable chemicals. The absorption magnitude provides additional confirmation on the substance of interest. The statistical method of Chemo-metrics will generate the best presentation for identification of chemicals and for profiling of the air/particulate sample. The entire operation for the Variable Laser Energy Air-Sampling Multi-Spectrometer can be automated. A skilled user in the art will establish reference database with chemicals and samples for comparison to those of unknowns.

A pulsed laser having a deep UV wavelength of shorter than 260 nm is used in this application. Illustratively, a 248 nm KrF excimer laser. This spectral region (~190 to 260 nm) provides resonance native absorption for explosive, microbe (biomolecules), and aromatic organic chemicals (for examples, benzene and toluene), generating Raman shifts in a clean region that are away from far-shift fluorescence (thus avoid spectral interference). The high photon energy from the deep-UV radiation facilitates molecular breakdown resulting in emissions from explosive and biomolecule fragments. The deep-UV laser also facilitates plasma formation for LIBS, generating molecular and atomic emissions from molecules and minerals. The operation of the Variable Laser Energy Multi-Spectrometer will "catch" those optimal events (spectra) for Absorption, Fluorescence, Raman Scattering, and Emission. Spectral information collected lead to identification for substances of interest and profiling for the air sample. The enclosed operation with potentially harmful deep UV radiation is one superior feature for this spectrometer.

Although the invention has been described in detail with reference to certain preferred embodiments, variations and modifications exist within the spirit and scope of the invention as described and defined in the following claims.

The invention claimed is:

1. A spectrometer system comprising:
    a spectrometer coupled to an optical section;
    a laser source;
    a first beam splitter, a second beam splitter, and a filter wheel disposed between the optical section and the laser source;
    a collimating scope disposed between the optical section and the second beam splitter;
    a filter photodiode; and
    a delay gate electrically coupled to the filter photodiode and the spectrometer,
    wherein the laser source directs energy to the first beam splitter, wherein the first beam splitter directs energy towards the optical section in a first direction and towards the second beam splitter in a second direction, wherein the second beam splitter directs energy towards the optical section in a third direction and towards a fourth direction, wherein the filter photodiode is disposed along the fourth direction.

2. The spectrometer system of claim 1, further comprising:
    a beam blocker disposed between the first beam splitter and a focusing lens;
    the focusing lens disposed between the beam blocker and the optical section; and
    a laser filter disposed between the optical section and the spectrometer.

3. The spectrometer system of claim 2, the optical section comprising:
    an inlet aperture;
    an outlet aperture; and
    a collection filter coupled to the outlet aperture.

4. The spectrometer system of claim 3, further comprising:
    a pump coupled to the optical section at the outlet aperture.

5. The spectrometer system of claim 4, wherein the optical section is an optical sphere.

6. The spectrometer system of claim 1, wherein the optical section is an optical sphere.

7. A method of spectroscopy comprising:
    directing a first laser energy towards a first beam splitter to create a second and a third laser energy;
    directing the second laser energy towards a collection filter disposed within an optical section;
    directing the third laser energy towards a second beam splitter to create a fourth and a fifth laser energy;
    directing the fourth laser energy towards a collimating scope coupled to the optical section;
    directing the fifth laser energy towards a filter photodiode;
    generating a first detection signal in the filter photodiode when the filter photodiode detects the fifth laser energy; and
    generating a second detection signal when a spectrometer detects the second and the fourth laser energies.

8. The method of claim 7, further comprising:
    disposing a beam blocker between the first beam splitter and the optical section to reduce the second laser energy.

9. The method of claim 7, further comprising:
    transmitting the first and second detection signals to a computer electrically coupled to the spectrometer.

* * * * *